United States Patent
Gold

Patent Number: 5,480,504
Date of Patent: Jan. 2, 1996

[54] METHOD OF PREAFFIXING A MOLDING TO A WINDSHIELD

[76] Inventor: Peter Gold, 389 Peninsula Blvd., Hempstead, N.Y. 11550

[21] Appl. No.: 239,355

[22] Filed: May 6, 1994

[51] Int. Cl.$^6$ .................................................. B60J 1/02
[52] U.S. Cl. ............................ 156/108; 296/93; 296/201
[58] Field of Search ........................... 156/108; 296/201, 296/93, 84.1

[56] References Cited

U.S. PATENT DOCUMENTS

| | | | |
|---|---|---|---|
| 1,259,117 | 3/1918 | McCormick | 296/93 |
| 2,794,218 | 6/1957 | Ramsay | 296/93 |
| 5,009,462 | 4/1991 | Katcherian | 296/201 |
| 5,163,731 | 11/1992 | Gold | 296/201 |

*Primary Examiner*—Michael W. Ball
*Assistant Examiner*—Sam Chuan Yao

[57] ABSTRACT

A molding for the peripheral edge of an auto windshield extruded with a configurated leg to serve as a convenient hand grip by which, once gripped and urged through a pivotal traverse, opens up a compartment into which the peripheral windshield edge is readily projected to achieve the preliminary preaffixing thereof to the windshield preparatory to permanent affixation using an adhesive during installation in the auto windshield opening.

1 Claim, 1 Drawing Sheet

U.S. Patent  Jan. 2, 1996  5,480,504
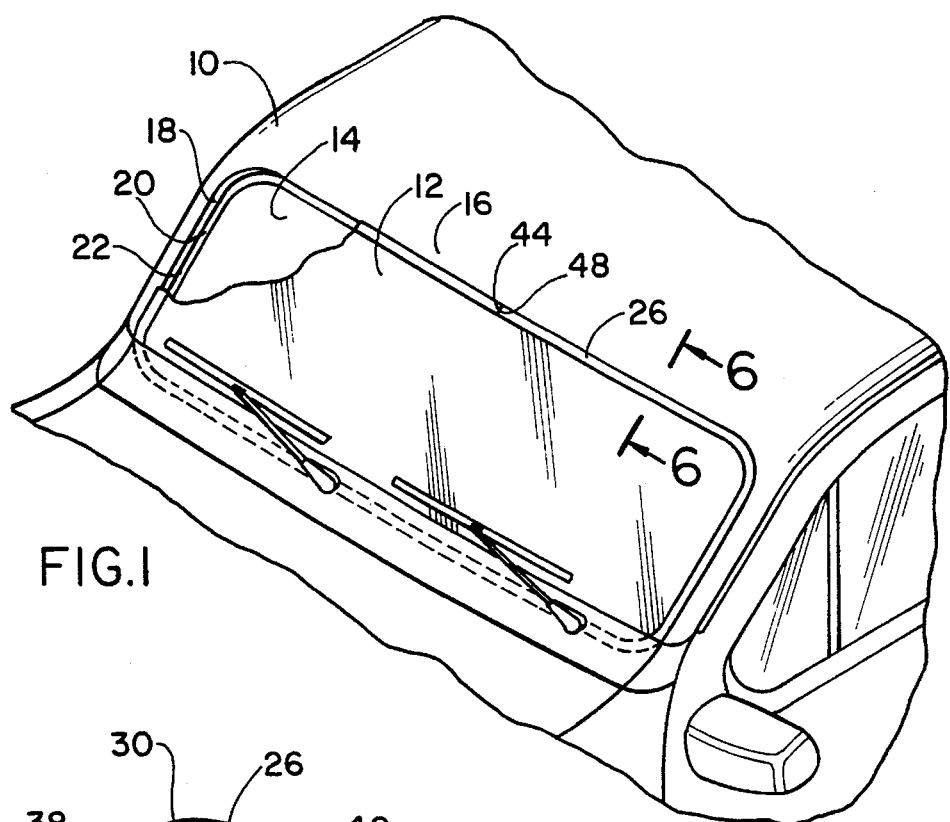
FIG.1
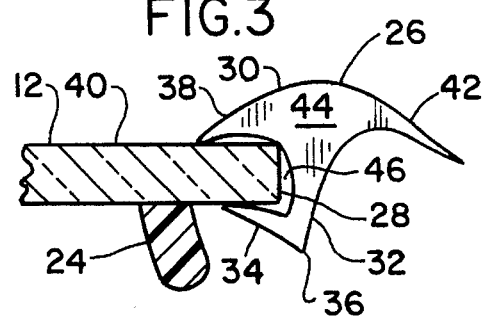
FIG.2
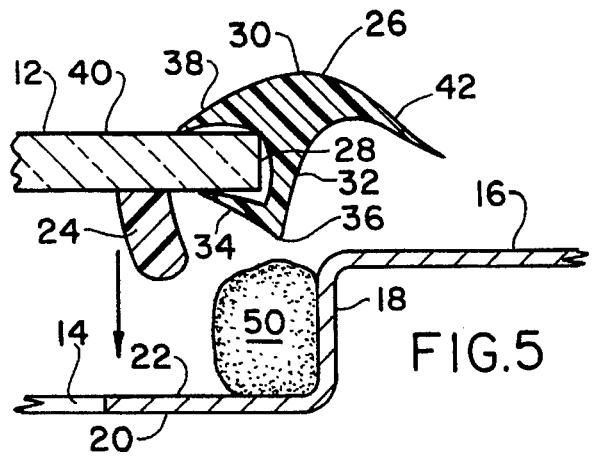
FIG.3
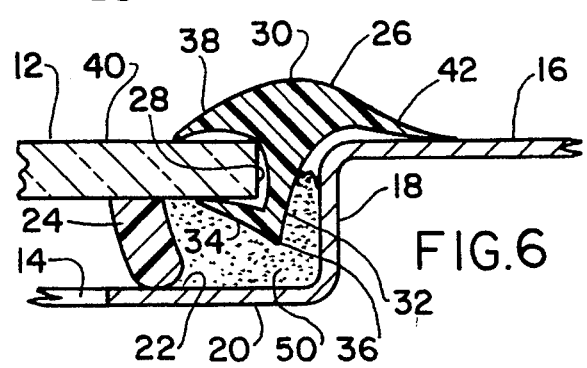
FIG.4
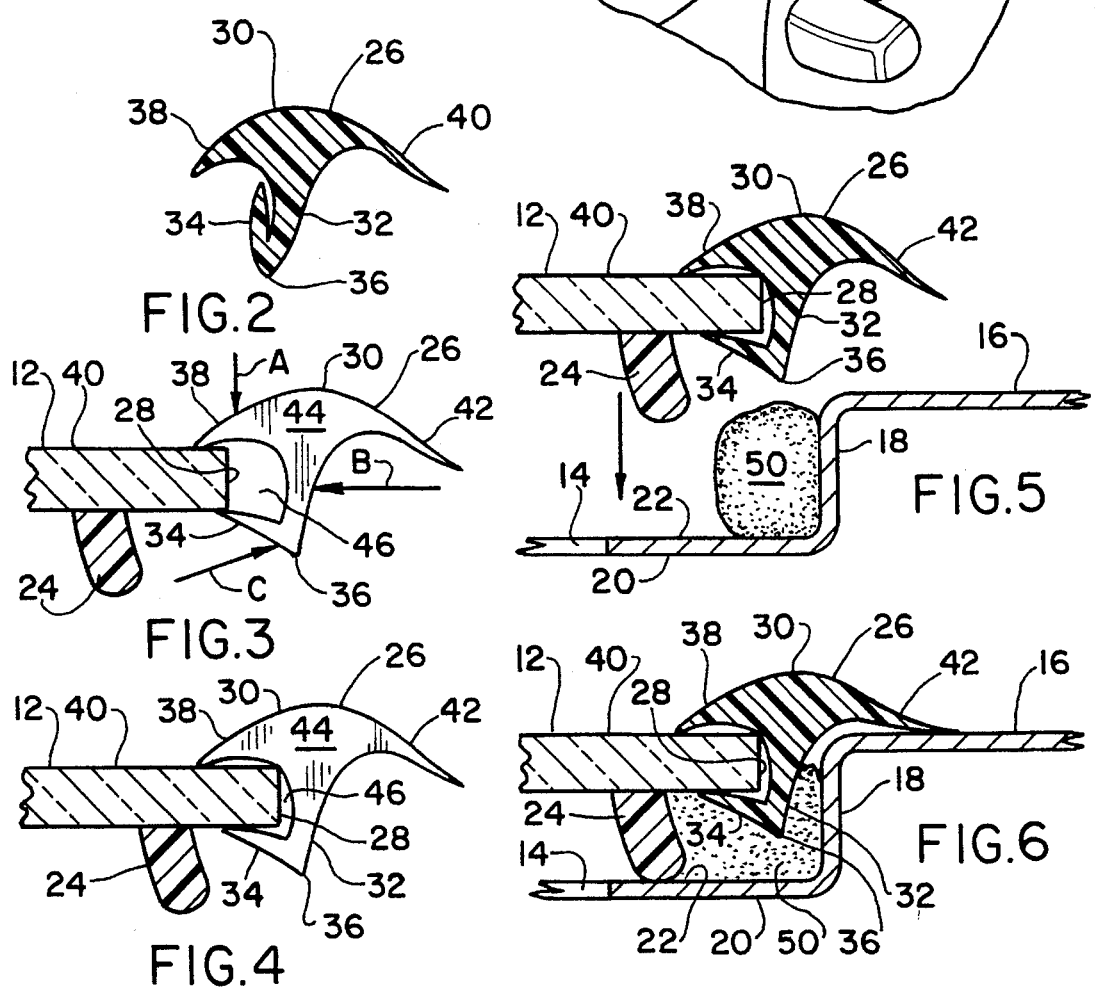
FIG.5
FIG.6

1

METHOD OF PREAFFIXING A MOLDING TO A WINDSHIELD

The present invention relates generally to improvements in installing weather-insulated auto windshields, and more particularly to the effective use of a molding-enhancing construction for facilitating the preaffixing of the molding about the windshield peripheral edge.

BACKGROUND OF THE INVENTION

The rubber construction material of the trim which insulates the windshield against water and air leakage is inert to chemical bonding with urethane, preferred as the adhesive in auto windshield installations because of its pliability in its initial condition as a viscous mass, and its subsequent curing into a solid condition providing a firm adhesive connection. As a substitute for the unavailable chemical bond, mechanical interlocking substitutes have been proposed such as a frictional grip established between the trim or reveal molding and windshield to supplement the urethane bonding as disclosed and illustrated in my prior U.S. Pat. No. 5,163,731 issued for "Vehicle Reflective Molding" on Nov. 17, 1992, and U.S. Pat. No. 4,165,119 issued on Aug. 2, 1979 to Hedeen et al. which describes a window reveal molding 50 which, according to accepted practice, has retrorse fins 58–68 on opposite sides of a depending stem 54 to become embedded into the curing urethane. While the aforesaid prior art installation procedures are generally effective, they do not contribute to a preferred technique of preframing or preaffixing the molding to the windshield and attaching same as an assembly in the auto windshield opening, as distinguished from an alternative technique of inserting the molding in the gap between a previously positioned windshield and the body flange bounding the windshield opening.

Broadly, it is an object of the present invention to achieve an effective windshield installation using to advantage a handling method for the molding overcoming the foregoing and other shortcomings of the prior art.

More particularly, it is an object to construct the molding, which can readily be done because it is an extrusion, using an extrusion die that produces a cross sectional profile or configuration that enables the molding to be more easily, than has heretofore been possible, placed in encircling relation about the peripheral edge of the windshield.

Underlying the present invention, and as should be readily understood as the description proceeds, is the recognition that the task of preaffixing a "tight" friction-fitting molding is significantly enhanced by construction of the molding to serve this end. Thus, a leg extruded integral of the molding is provided as a convenient hand grip by which, once gripped and urged through a pivotal traverse, provides an available compartment into which the peripheral windshield edge is readily projected to achieve a desired subassembly of windshield and molding, preparatory to a final assembly of same in an auto windshield opening.

The description of the invention which follows, together with the accompanying drawings should not be construed as limiting the invention to the example shown and described, because those skilled in the art to which this invention appertains will be able to devise other forms thereof within the ambit of the appended claims.

BRIEF DESCRIPTION OF THE DRAWINGS

FIG. 1 is a partial perspective view of a typical auto front windshield;

FIG. 2 is an enlarged scale cross sectional isolated view of the molding adapted to be preaffixed to the windshield to serve as a weather seal;

FIGS. 3 and 4 are partial side elevational views illustrating, in sequence, the within inventive method of preaffixing the molding of FIG. 2 to the windshield; and FIGS. 5 and 6 are partial cross sectional views taken along line 6—6 of FIG. 1 illustrating, in sequence, the installation of the windshield with its preaffixed molding into its FIG. 1 position.

DETAILED DESCRIPTION OF THE INVENTION

In FIG. 1 there is depicted a typical auto 10 having a windshield 12 mounted or installed in an opening 14 formed in the front of the auto body 16. As shown in more detail in FIGS. 5 and 6, the windshield opening 14 has an internal peripheral wall 18 which is perpendicular to surface 16. Wall 18 has an inner flange 20 parallel to the external surface 16, wherein the components 18, 20 cooperate to provide a seat 22 for a depending so-called dam 24 which is previously adhesively secured to windshield 12 to confine the windshield adhering adhesive or urethane deposit 50 from leaking internally of the windshield. Prior to placing windshield 12 in position on seat 22, however, use is made of a molding 26 constructed to enhance the within inventive method, the object of which method is to preaffix the molding 26 about the outer or peripheral edge 28 of windshield 12.

Molding 26, as best shown in FIG. 2, is fabricated as an extrusion of a pliant plastic or rubber construction material and will be understood in these respects to be typical of the many prior art moldings used as weather-barrier windshield seals. To this end, it includes a crown or trim portion 30 and a resilient first leg or stem 32 depending from crown 30. A second folded-back leg 34 is provided as a continuation of the lower end 36 of stem 32, the reverse or fold-back being almost 180 degrees. As seen in the first assembly or method step depicted in FIG. 3, the left-hand overhang 38 of crown 30 is intended to bear on the outer surface 40 of windshield 12 while the right-hand overhang 42 is shaped to be, and serves as a weather seal bearing against body surface 16 to prevent water leakage past the installed windshield (see FIG. 6).

In FIG. 3, a combination of simultaneous forces A, B and C are applied to the leading end 44 of a length of molding 26, such that force A causes crown section 38 to bear on windshield surface 40, force C results in a counter-clockwise rotation of flap or leg 34 relative to stem 32 in conjunction with a bending back of stem 32 which opens a U-shaped configuration or compartment 46, thus producing a closing movement force urgency in crown section 38 and leg 34. Force B urges the molding in closing movement onto the glass edge 28 which is projected into opening 46 resulting in a preaffixing of molding 26 on this windshield edge. Once the depicted position of end 44 of molding 26 is achieved, namely in their relative positions shown in FIG. 4, the forces A, B and C are discontinued at the starting point, but are successively assumed, i.e. applied at a next adjacent point or location, and this seating or preaffixing of molding 26 successively continued about the entire periphery of windshield 12, until an ending closure joint 48 coinciding with the trailing end of the length of molding 26 is reached. Once the assembly of windshield and molding 12, 26 is achieved, this assembly is in condition to be installed to its seat 22 in the auto opening 14 using a deposit of urethane and/or rubber cement 50 previously advantageously positioned in the juncture of wall 18 and flange 20, as best seen in FIG. 5. The final installation step contemplates that windshield 12 will be lowered until the seal member or dam 24 rests firmly on seat 22 and cement 50 assumes movement surrounding stem 32 and flap 34 on the molding 26 to hold, as generally understood, windshield 12 in its installed condition in the auto opening 14.

Underlying the present invention, and as should be readily understood from the foregoing disclosure, is the recognition that the task of preaffixing a "tight" friction-molding is significantly enhanced by construction of the molding to serve this end. Thus, leg 34 can, and does, effectively serve, as a convenient hand grip, which upon being gripped and given a simple pivotal traverse from its starting FIG. 2 position into its position of movement of FIG. 3, provides the windshield edge-receiving compartment 46 and the facilitated projection of edge 28 under the urgency of the holding forces A and C. It is further to be noted that the fabrication of molding 26 as an extrusion presents no problem in achieving the profile configuration depicted in the cross sectional view of FIG. 2.

Lastly, to be noted is that, after achieving the seated position of the molding 26 to the windshield peripheral edge 28 as shown in FIG. 4, an appropriate nominal deposit of adhesive 50 (not shown in FIG. 4) can be strategically positioned between the leg 34 and the seal member or dam 24 which would, in this location, also be in contact with the exposed rear surface of the windshield 12 to assist in maintaining, by supplementing the friction grip already established, of the molding 26 preaffixed to the windshield 12. This is recommended if the abuse of handling the combined windshield and molding 12, 26 before it is installed in the auto window opening 14 is likely to inadvertently dislodge the molding from its frictional grip on the windshield 12.

More typically, however, the combined windshield and molding 12, 26 will be intact so as to be sealed in place according to the method steps of FIGS. 5 and 6.

While the method herein disclosed in detail is fully capable of attaining the objects and providing the advantages hereinbefore stated, it is to be understood that it is merely illustrative of the invention, and that no limitations are intended thereto other than as defined in the appended claims.

What is claimed is:

1. A method of preparing an auto windshield having a peripheral edge for installation in an auto from opening comprising the steps of forming an elastomeric extruded molding into a T-shaped profile presenting an upper crown, a first leg in depending relation therefrom, and a second leg extension of said first leg in a 180 degree turned orientation in relation thereto, selecting a starting location along said windshield peripheral edge, engaging the molding at a location upon the crown portion located laterally of said first leg destined to have an operative position overlying the windshield peripheral edge, positioning the engaged crown portion of the molding in an adjacent clearance position from said starting location, engaging a free end of said second leg proximate said engaged crown portion, causing a 90 degree reversal in orientation of said second leg from its initial 180 degree turned orientation to correspondingly form a U-shaped opening between said engaged crown portion and second leg which is in facing relation to said windshield peripheral edge, urging said U-shaped opening through closing movement from said clearance position onto said starting location of said windshield peripheral edge for positioning said crown and second leg on opposite sides thereof, releasing said second leg and the attendant urgency of its elastomeric construction material incident to providing a seated position of said molding at said starting location of said windshield peripheral edge, and repeating the preceding steps at progressively advanced locations along said windshield peripheral edge, whereby said windshield is adapted to be positioned in an appropriately sized front opening of an auto with said molding in attached relation to complete a commercially acceptable installation thereof.

\* \* \* \* \*